UNITED STATES PATENT OFFICE 2,477,162

MANUFACTURE OF BETA DINITRO COMPOUNDS

Carl T. Bahner, Jefferson City, and Harvey T. Kite, Oak Ridge, Tenn.; said Kite assignor to said Bahner No Drawing. Application April 30, 1948, Serial No. 24,438

6 Claims. (Cl. 260—644)

Our invention relates to a process of manufacturing a series of polynitro aliphatic compounds having the following structural formula:

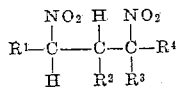

where $R^1$ is a substituent selected from the group consisting of hydrogen and alkyl, $R^2$ and $R^3$ are selected from the group consisting of hydrogen and alkyl, and $R^4$ is a substituent selected from the group consisting of alkyl, nitroalkyl, and alkoxyalkyl. This process involves a reaction between nitroolefins and salts of nitroalkanes.

Among the compounds included by the above formula there may be mentioned as illustrative, the following: 1,3-dinitrobutane, 1,3-dinitropentane, 1,3-dinitrohexane, 1,3-dinitroheptane, 1,3-dinitrooctane 1,3-dinitro-3-methylbutane, 1,3-dinitro-2-ethylpropane, 1,3-dinitro-2-ethylbutane, 1,3-dinitro-2-ethylpentane, 1,3-dinitro-2-ethyl-3-methylbutane, 1,3-dinitro-2-propylhexane, 3,5-dinitro-4-ethylpentane, 3,5-dinitro-4-ethylhexane, 3,5-dinitro-4-ethylheptane, 3,5-dinitro-4-ethyloctane, 3,5-dinitro-4-ethylnonane, 3,5-dinitro-2-ethyl-3-methylheptane, 3,5-dinitro-3-methylhexane, 3,5-dinitro-6-ethoxyoctane, 2,3,5-trinitro-2-methyloctane, and the like.

In the past a number of methods have been proposed for preparing polynitro compounds which yielded products in which the nitro group is attached to the same or adjacent carbon atoms.

Our invention provides a method of making new aliphatic polynitro compounds in which the nitro groups are in the beta position with respect to each other, that is, the nitro groups are attached to carbon atoms which are separated from each other by a single additional carbon atom. This is accomplished by causing a nitroolefin to react with a salt of a nitroalkane under conditions favoring the formation of beta dinitro compounds.

In practicing our invention we disperse a salt of a nitroalkane in an inert organic reaction medium such as ethyl alcohol, and slowly add thereto the nitroalkene. The reaction is somewhat exothermic and the time required for completion of the reaction varies somewhat depending on the reactants, but 15 minutes to one hour after addition of all the reactants is generally sufficient. The completion of the reaction can readily be detected by the disappearance of the lacrymatory odor of the nitroolefin. Side reactions are, in general, suppressed by keeping the reaction mixture cold and not allowing it to stand too long after the reaction has ended. The formation of undesired products is also prevented by keeping the reaction mixture substantially free from water and from free base. For highest yields at least about one mole of the nitroalkane salt should be used for each mole of product sought, and an excess of nitroalkene above the quantity consumed in forming the desired product should be avoided. After completion of the reaction, the dinitro compound which is present in the form of its salt can be used in this form for many reactions, for example to react with additional nitroolefin to form a compound containing three or more nitro groups. If the free dinitro compound is desired it is liberated by the addition of a weak acid, such as acetic acid, and recovered by dilution of the mixture with water and extraction with an organic solvent or by other convenient means.

The nitroalkanes suitable for use in our process are all those indicated in the structural formula:

wherein $R^3$ may be either hydrogen or alkyl, and $R^4$ is selected from the group consisting of alkyl, nitroalkyl, and alkoxyalkyl. As specific examples of compounds of this class may be mentioned nitroethane, 1-nitropropane, 2-nitropropane, 1-nitrobutane, 2-nitrobutane, 1-nitropentane, 2-nitro-1-ethoxybutane, 1-nitro-2-ethoxypentane, 2,4-dinitro-2-methylpentane, 1,3-dinitrobutane, and the like. The salts such as, for example, the sodium or potassium salts of the above or other primary or secondary nitroalkanes are first produced by any convenient method. In general, any alkali metal salt may be used so long as it is soluble in the solvent employed for the reaction with the nitroolefin. These alkali metal salts have the structural formula:

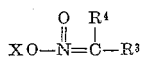

wherein X represents an alkali metal atom, $R^3$ represents a substituent selected from a group consisting of H and alkyl and $R^4$ represents a substituent selected from a group consisting of alkyl, nitroalkyl and alkoxyalkyl.

The nitroolefins which may be used in our process are of the type represented by the structural formula:

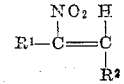

wherein R¹ and R² are substituents selected from the group consisting of hydrogen and alkyl. Specific examples of such compounds are: nitroethylene, 1-nitro-1-butene, 2-nitro-1-butene, 1-nitro-1-pentene, 3-nitro-3-hexene, and the like.

The reaction is preferably carried out in a solvent medium which may comprise any solvent which is a good solvent for both the nitroalkane salt and the nitroolefin. In addition, the solvent chosen must not react with either the salt of the nitroalkane, or the nitroolefin or the polynitro compound formed during the reaction. Methyl, ethyl, and isopropyl alcohols are examples of suitable solvents.

As illustrative of our invention the following examples are given.

*Example I*

A solution of the potassium salt of 1-nitropropane was prepared by dissolving 67.3 grams of 1-nitropropane in 540 ml. of 1.278 N. alcoholic potash. To this solution was then added 67.9 grams of fresh 2-nitro-1-butene with vigorous stirring and while maintaining the reaction mixture at a temperature of 15–18° C. After standing for approximately 90 minutes the reaction mixture was acidified at 10° C. by the addition of acetic acid upon dilution of the reaction mixture with three times its volume of water, 67.6 grams of crude product was obtained in the form of a clear oily liquid. After purification by washing with water, fractional distillation at 1 mm. pressure, and repeated recrystallization from chilled methanol, pure 3,5-dinitroheptane was obtained in the form of white, needle-shaped crystals having a melting point of 33° C.

*Example II*

Forty-five grams (0.5 mole) of 2-nitropropane was added to 221 ml. of 2.259 N. alcoholic potassium hydroxide. This solution was chilled in an ice bath and 50.2 g. (0.497 mole) of fresh 2-nitro-1-butene added in small portions with vigorous stirring over a period of 30 minutes, keeping the temperature at 18–20° C. At the end of this time the reaction mixture suddenly deposited a large quantity of white crystals of the potassium salt of aci-3,5-dinitro-3-methylhexane. After dilution with water to approximately 500 ml. the salt was converted to 3,5-dinitro-3-methylhexane by acidifying with acetic acid, a 90% yield of crude product being obtained. Repeated recrystallization from chilled methanol yielded an analytically pure product in the form of white crystals which could be kept indefinitely in an ice chest but melted below room temperature.

*Example III*

Twenty-seven grams (0.3 mole) of 2-nitropropane was dissolved in 134 ml. of 2.24 N. alcoholic potassium hydroxide. To this solution was then added 30.3 g. (0.3 mole) of 1-nitro-1-butene in 1 ml. portions over a period of approximately 30 minutes, while vigorously stirring and maintaining the temperature at about 20° C. After standing an additional 15 minutes at this temperature the solution was acidified with acetic acid while maintaining the temperature at 5–15° C. After dilution to one liter with water the 1,3-dinitro-2-ethyl-3-methylbutane separated as an oil in a yield of 85% of the theoretical. The properties of the product recrystallized from methanol were: $n_d^{25}=1.463$; $d_4^{25}=1.152$.

These dinitro compounds have been found to be useful in the preparation of numerous organic compounds. Other uses of these products will be apparent to those skilled in the art.

While the above describes the preferred embodiments of our invention, it will be understood that departures may be made therefrom within the scope of the specification and claims.

This application is a continuation of my U. S. Serial No. 654,512, filed March 14, 1946, now abandoned.

What is claimed is:

1. In the manufacture of polynitro aliphatic compounds, the process which comprises mixing in substantially equimolecular proportions an alkali and a nitroalkane to form an alkali metal nitroalkane salt, said nitroalkane having the structural formula:

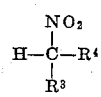

wherein R³ is a substituent selected from a group consisting of H and alkyl, and R⁴ is selected from a group consisting of alkyl, nitroalkyl and alkoxyalkyl, mixing the resulting reaction products in the presence of an inert organic solvent with a nitroolefin having the structural formula:

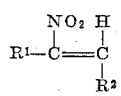

wherein R¹ and R² are substituents selected from a group consisting of hydrogen and alkyl to cause a reaction between said nitroalkane salt and said nitroolefin, thereby producing in the form of its alkali metal salt, a polynitro compound having the structural formula:

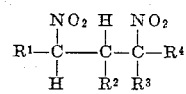

wherein R¹, R², R³ and R⁴ have their former significances.

2. In the manufacture of polynitro compounds, the process which comprises preparing a dispersion in an inert organic solvent of an alkali metal salt of a nitro compound having the formula

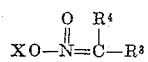

wherein X represents an alkali metal atom, R³ represents a substituent selected from a group consisting of H and alkyl and R⁴ represents a substituent selected from a group consisting of alkyl, nitroalkyl and alkoxyalkyl; reacting the said salt with a nitroolefin having the structural formula

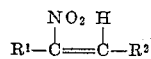

wherein R¹ and R² are substituents selected from a group consisting of hydrogen and alkyl, thereby producing, in the form of its alkali metal salt, a polynitro compound having the structural formula

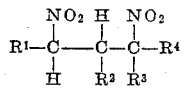

wherein R¹, R², R³ and R⁴ have their former significances.

3. In the manufacture of polynitro compounds, the process which comprises preparing a dispersion in an inert organic solvent of an alkali metal salt of a nitro compound having the formula

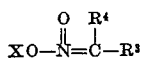

wherein X represents an alkali metal atom, $R^3$ represents a substituent selected from a group consisting of H and alkyl and $R^4$ represents a substituent selected from a group consisting of alkyl, nitroalkyl and alkoxyalkyl; reacting the said salt in substantially equimolecular proportions with a nitroolefin having the structural formula

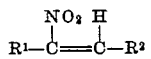

wherein $R^1$ and $R^2$ are substituents selected from a group consisting of hydrogen and alkyl, thereby producing, in the form of its alkali metal salt, a polynitro compound having the structural formula

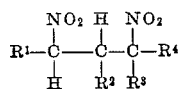

wherein $R^1$, $R^2$, $R^3$ and $R^4$ have their former significances.

4. In a process for the production of 3,5-dinitroheptane, the step which comprises reacting the potassium salt of 1-nitropropane with 2-nitro-1-butene.

5. In a process for the production of 1,3-dinitro-2-ethyl-3-methylbutane, the step which comprises reacting the potassium salt of 2-nitropropane with 1-nitro-1-butene.

6. In a process for the production of 3,5-dinitro-3-methylhexane, the step which comprises reacting the sodium salt of 2-nitropropane with 2-nitro-1-butene.

CARL T. BAHNER.
HARVEY T. KITE.

REFERENCES CITED

The following references are of record in the file of this patent:

UNITED STATES PATENTS

| Number | Name | Date |
|---|---|---|
| 2,343,256 | Haas et al. | Mar. 7, 1944 |
| 2,383,603 | Larrison et al. | Aug. 28, 1945 |

OTHER REFERENCES

Haas, "Ind. & Eng. Chem.," vol. 35 (Nov., 1943), page 1151.

Fraser et al., "Jour. Chem. Soc.," (London) 1934, pages 607–610.

Haas et al., "Chem. Reviews," vol. 32, pages 387 and 414 (1943).

Keppler, "Berichte Deutsche Chem. Gessell," vol. 25, page 1710.

Heine, "Berichte Deutsche Chem. Gessell," vol. 44 (1911), pages 2016–2022.

Meisenheimer et al., "Berichte Deutsche Chem. Gessell," vol. 38 (1905), page 466.

Konowalow, "Chem. Zeut.," 1906 I page 737.

Poni, "Chem. Zeut.," 1903 I page 624.